US009113288B2

(12) United States Patent  (10) Patent No.: US 9,113,288 B2
Sauerbrey et al.  (45) Date of Patent:  Aug. 18, 2015

(54) CONTROLLING A SHORT-RANGE WIRELESS CONNECTION BETWEEN A VEHICLE TELEMATICS UNIT AND AN IN-VEHICLE AUDIO SYSTEM

(71) Applicant: General Motors LLC, Detroit, MI (US)

(72) Inventors: Steven S. Sauerbrey, Farmington Hills, MI (US); Kier M. Mathieson, Grosse Pointe Farms, MI (US); Jonathan L. Gerlach, Canton, MI (US)

(73) Assignee: General Motors LLC, Detroit, MI (US)

( * ) Notice: Subject to any disclaimer, the term of this patent is extended or adjusted under 35 U.S.C. 154(b) by 24 days.

(21) Appl. No.: 14/156,981

(22) Filed: Jan. 16, 2014

(65) Prior Publication Data

US 2015/0201297 A1  Jul. 16, 2015

(51) Int. Cl.
*B60Q 1/00* (2006.01)
*H04W 4/00* (2009.01)
*G08B 25/10* (2006.01)
*H04W 76/00* (2009.01)
*H04M 1/60* (2006.01)

(52) U.S. Cl.
CPC .............. *H04W 4/008* (2013.01); *G08B 25/10* (2013.01); *H04M 1/6083* (2013.01); *H04W 76/007* (2013.01)

(58) Field of Classification Search
CPC ..... H04W 4/046; H04W 4/22; H04W 76/007; G07C 5/008; H04M 1/6075; H04M 1/6083
USPC ........... 340/436, 438; 455/41.2, 404.1, 569.2; 701/1
See application file for complete search history.

(56) References Cited

U.S. PATENT DOCUMENTS

| 6,188,315 | B1 * | 2/2001 | Herbert et al. ................. 340/438 |
| 6,337,641 | B1 * | 1/2002 | Yoshioka et al. ............. 340/989 |
| 6,792,296 | B1 * | 9/2004 | Van Bosch .................. 455/569.2 |
| 7,323,973 | B1 * | 1/2008 | Ceglia et al. ................ 455/569.2 |
| 7,877,275 | B2 * | 1/2011 | Ball .................................. 705/3 |
| 7,904,053 | B2 * | 3/2011 | Krasner et al. ............. 455/404.1 |
| 8,054,168 | B2 * | 11/2011 | McCormick et al. ......... 340/436 |
| 8,155,867 | B2 * | 4/2012 | Krause ............................ 455/39 |
| 8,180,337 | B2 * | 5/2012 | Veliu et al. ................. 455/569.2 |
| 8,335,502 | B2 * | 12/2012 | Oesterling et al. ............ 455/419 |
| 8,744,397 | B2 * | 6/2014 | Gee et al. .................... 455/404.1 |
| 8,874,279 | B2 * | 10/2014 | Frye et al. .......................... 701/1 |
| 8,892,090 | B2 * | 11/2014 | Gee et al. ...................... 455/41.2 |
| 2005/0065779 | A1 * | 3/2005 | Odinak ......................... 704/201 |

* cited by examiner

*Primary Examiner* — John A Tweel, Jr.
(74) *Attorney, Agent, or Firm* — Anthony Luke Simon; Reising Ethington P.C.

(57) ABSTRACT

A system and method of communicating using a vehicle telematics unit and an in-vehicle audio system includes detecting a vehicle event at the vehicle telematics unit; terminating any existing short-range wireless connections between the vehicle telematics unit and wireless devices carried by a vehicle occupant; establishing a short-range wireless connection between the vehicle telematics unit and the in-vehicle audio system; and providing communications between the vehicle occupant and a central facility using the short-range wireless connection established between the vehicle telematics unit and the in-vehicle audio system.

15 Claims, 2 Drawing Sheets

CONTROLLING A SHORT-RANGE WIRELESS CONNECTION BETWEEN A VEHICLE TELEMATICS UNIT AND AN IN-VEHICLE AUDIO SYSTEM

TECHNICAL FIELD

The present invention relates to wireless communications and more particularly to controlling a short-range wireless connection between a vehicle telematics unit and an in-vehicle audio system.

BACKGROUND

Vehicles can establish short-range wireless communications links using a vehicle telematics unit. In one example, the vehicle telematics unit can detect the presence of a wireless device, such as a smart phone, in or near the vehicle and establish a short-range wireless link between the vehicle telematics unit and the smart phone. The vehicle telematics unit can then facilitate communications between the wireless device and an in-vehicle audio system. For instance, a vehicle occupant can place a call using the wireless device and hear the call through vehicle speakers while speaking into a microphone located inside the vehicle. This call can be communicated between the wireless device and the in-vehicle audio system via the vehicle telematics unit using a vehicle bus using an audio connection that is hard-wired into a vehicle at the time of manufacture.

SUMMARY

According to an aspect of the disclosure, there is provided a method of communicating using a vehicle telematics unit and an in-vehicle audio system. The method includes detecting a vehicle event at the vehicle telematics unit; terminating any existing short-range wireless connections between the vehicle telematics unit and one or more wireless devices carried by a vehicle occupant; establishing a short-range wireless connection between the vehicle telematics unit and the in-vehicle audio system; and providing communications between the vehicle occupant and a central facility using the short-range wireless connection established between the vehicle telematics unit and the in-vehicle audio system.

According to another aspect of the disclosure, there is provided a method of communicating using a vehicle telematics unit and an in-vehicle audio system. The method includes establishing a first link between the vehicle telematics unit and the in-vehicle audio system via a short-range wireless connection, wherein the first link is designated as a passive link; establishing a second link between the vehicle telematics unit and a wireless device carried by a vehicle occupant, wherein the second link is designated as an active link; detecting a vehicle event using the vehicle telematics unit; terminating the second link and designating the first link to be active in response to detecting the vehicle event; and providing communications between the vehicle occupant and a central facility using the first link.

According to yet another aspect of the disclosure, there is provided a system of communication. The system uses an in-vehicle audio system that includes a display, a microphone, one or more audio speakers, and a first antenna capable of communicating using one or more short-range wireless protocols; and a vehicle telematics unit having an electronic processing device, a memory device, and an antenna capable of communicating using one or more short-range wireless protocols, wherein the vehicle telematics unit establishes a first link with the in-vehicle audio system via a short-range wireless protocol, establishes a second link with a wireless device carried by a vehicle occupant via a short-range wireless protocol, detects a vehicle event and terminates the second link, and provides communications between the vehicle occupant and a central facility using the first link.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The system and method described below communicates between a vehicle telematics unit and an in-vehicle audio system using a short-range wireless connection. In addition to supporting a short-range wireless connection with a wireless device carried by a vehicle occupant, the vehicle telematics unit can also establish another short-range wireless connection with the audio system. Instead of communicating between the audio system and the vehicle telematics unit via a hard-wired bus, the short-range wireless connection can be used to communicate voice and/or data. When a vehicle event is detected, the vehicle telematics unit can end the short-range wireless connection with the wireless device belonging to the vehicle occupant and establish the short-range wireless connection with the audio system. After doing so, the vehicle occupant can provide speech to the microphone and receive sound from the speakers both of which are communicated through the short-range wireless link between the audio system and the vehicle telematics unit. The vehicle telematics unit communicates speech from the microphone to a central facility and receives audible sound from the central facility in return. Controlling the short-range wireless links in this manner can be helpful when the vehicle telematics unit supports a single short-range wireless communication link at one time.

Communications System—

Figure 1:
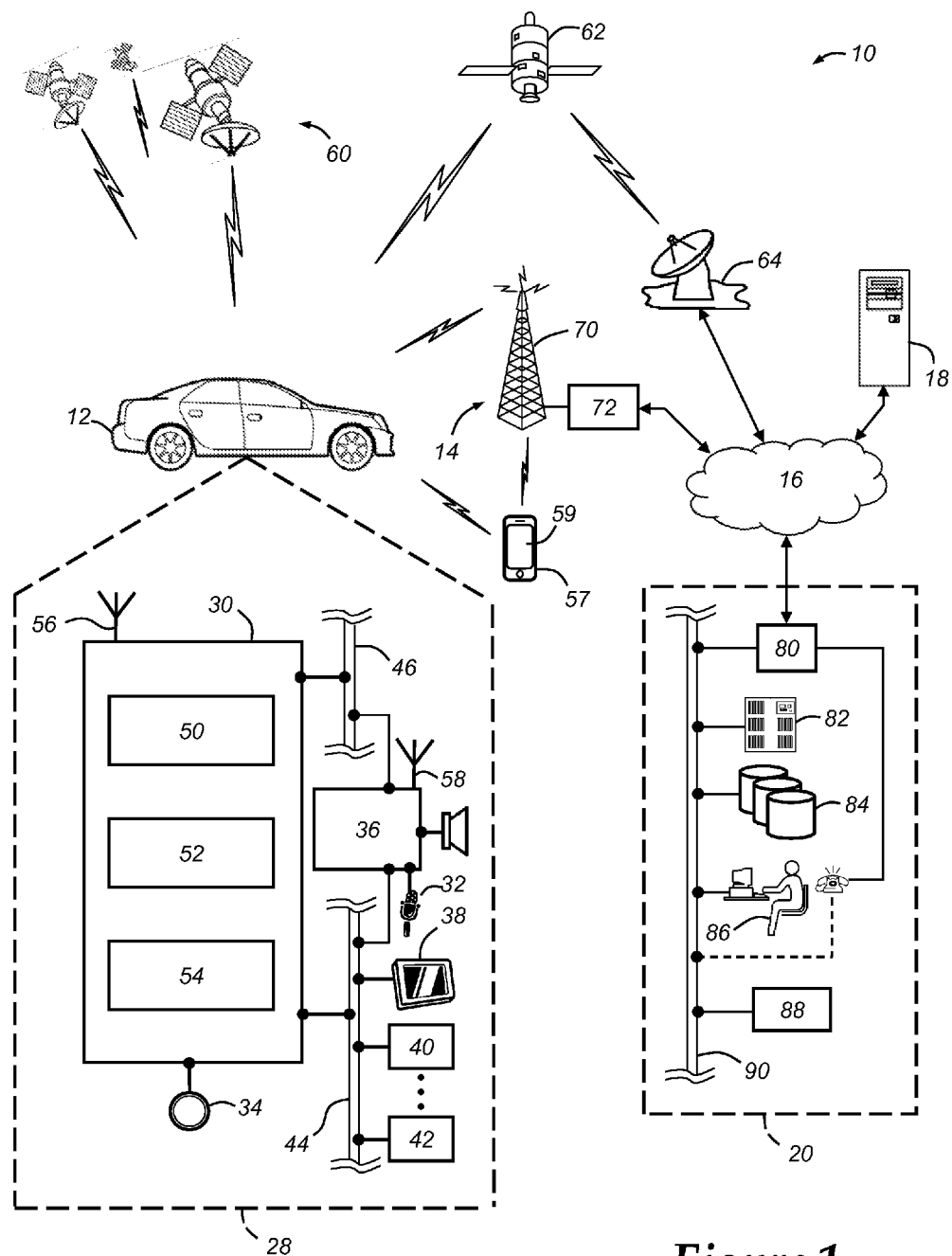
FIG. 1 is a block diagram depicting an embodiment of a communications system that is capable of utilizing the method disclosed herein.

With reference to FIG. 1, there is shown an operating environment that comprises a mobile vehicle communications system 10 that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, pushbutton(s) 34, whereas others are indirectly connected using one or more network connections, such as a communications bus 44, an entertainment bus 46, or a short-range wireless connection via antennas 56 and 58. Examples of suitable network connections include a controller area network (CAN), a media oriented system transfer (MOST), a local interconnection network (LIN), a local area network (LAN), and other appropriate connections such as Ethernet, Bluetooth, Wi-Fi, or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly using antenna 56 according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a wireless device, such as a smart phone 57. The smart phone 57 can include computer processing capability, a transceiver capable of communicating using a short-range wireless protocol via an antenna, and a visual smart phone display 59. In some implementations, the smart phone display 59 also includes a touch-screen graphical user interface and/or a GPS module capable of receiving GPS satellite signals and generating GPS coordinates based on those signals. Examples of the smart phone 57 include the iPhone™ manufactured by Apple, Inc. and the Droid™ manufactured by Motorola, Inc. These and other similar devices may be used or considered as a type of separate wireless device for the purposes of the method described herein. While the smart phone 57 is described with the method below, it should be appreciated that other similar and/or simpler wireless devices can be successfully substituted for the smart phone 57 to carry out the method/system described herein. These simpler wireless devices can lack the ability to carry out cellular communications but still be able to communicate via short-range wireless communication protocols. Examples of these devices include an iPod Touch™ or an iPad™ each manufactured by Apple, Inc.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. The audio system 36 can provide AM, FM and satellite radio, CD, DVD and other multimedia functionality. This functionality can be provided in conjunction with or independent of the infotainment module described above. While according to the particular embodiment shown here the audio system 36 is operatively coupled to both vehicle bus 44 and entertainment bus 46, it is also possible to unlink the audio system 36 from the vehicle bus 44, the entertainment bus 46, or both and communicate between the vehicle telematics unit 30 and the audio system 36 using an antenna 58. The antenna 58 can be limited to carrying out short-range wireless communications using any one of the short-range wireless communication protocols, such as those defined by IEEE 802.11. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
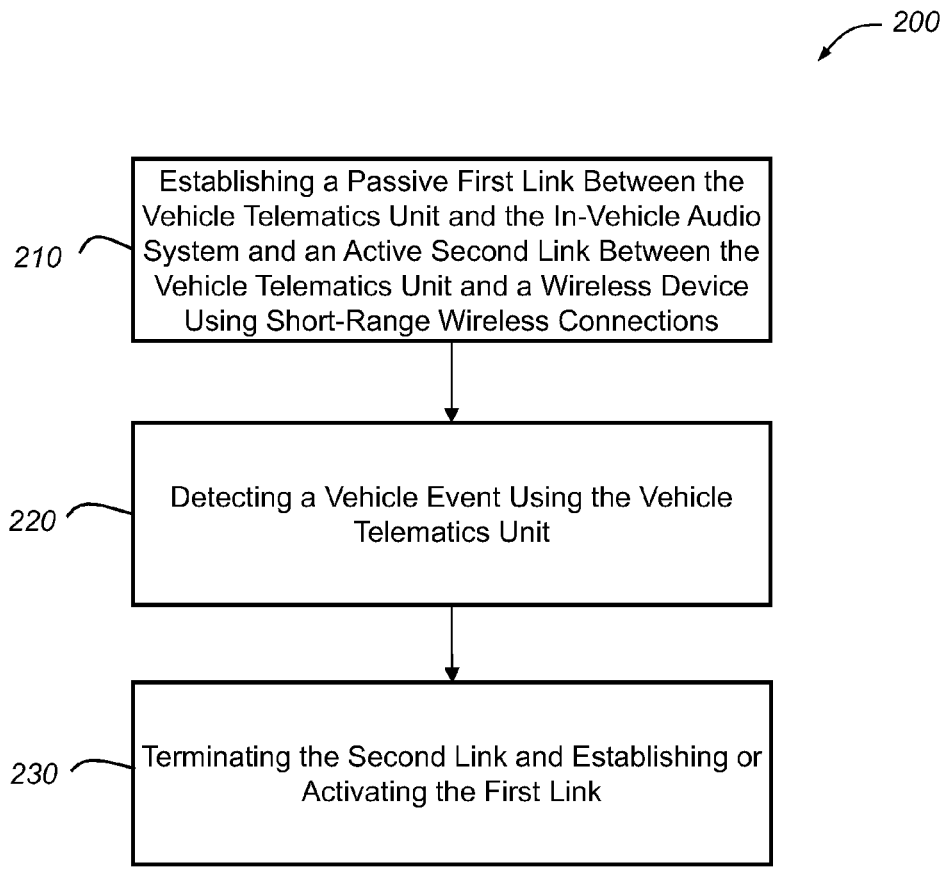
FIG. 2 is a flow chart depicting an embodiment of a method of communicating using a vehicle telematics unit and an in-vehicle audio system.

Turning now to FIG. 2, there is shown a method 200 of communicating using the vehicle telematics unit 30 and the audio system 36. The method 200 begins at step 210 by establishing a first link between the vehicle telematics unit 30 and the in-vehicle audio system 36 via a short-range wireless connection. The short-range wireless connection can be implemented as a Bluetooth or Wi-Fi connection. In this implementation, the vehicle telematics unit 30 may only be able to maintain one short-range wireless connection at a time. Thus, when a short-range wireless connection exists between the vehicle telematics unit 30 and the wireless device, it may not be possible to simultaneously maintain another short-range wireless connection with the audio system 36.

The vehicle telematics unit 30 can be paired with the audio system 36 when the vehicle 12 is manufactured. At that time, the audio system 36 and vehicle telematics unit 30 can be programmed to recognize each other through short-range communication protocols. In one implementation, this programming can include setting the first link to be passive or inactive. This setting can mean that the short-range wireless connection between the vehicle telematics unit 30 is secondary or in the background allowing the unit 30 to wirelessly connect with wireless devices carried by the vehicle occupant. As a result, the vehicle telematics unit 30 can remain able to establish a short-range wireless communication connection with the audio system 36 even though such a wireless connection may be dormant. A second link between the vehicle telematics unit 30 and a wireless device, such as the smart phone 57, carried by a vehicle occupant can be established when the first link is dormant. In this sense, the first link between the vehicle telematics unit 30 and the audio system 36 can be designated as a passive link while the second link between the unit 30 and the wireless device can be designated as an active link. For purposes of the method 200, the wireless device will be described in terms of smart phone 57. However, it should be appreciated that other wireless devices (e.g., laptops or tablets) can be used as well. The method 200 proceeds to step 220.

At step 220, a vehicle event is detected using the vehicle telematics unit 30. The vehicle event can be a condition occurring at the vehicle 12 that results in a vehicle occupant communicating verbally with a central facility, such as the call center 20. For example, the vehicle event can be detected as a result of the vehicle occupant pushing the button 34 located in the vehicle 12. The pushing of the button 34 can indicate to the vehicle telematics unit 30 that the vehicle occupant needs assistance from the call center 20 and direct the unit 30 to call the call center 20. Other circumstances can also create a detectable vehicle event. For instance, the vehicle 12 includes VSMs 42 linked to a number of sensors that can detect abrupt changes in motion or impact with objects thereby indicating that the vehicle 12 has been in an accident. Using the information gathered by the VSM 42 and/or sensors, the vehicle telematics unit 30 can detect the existence of an accident and as a result determine that a vehicle event exists. The method 200 proceeds to step 230.

At step 230, the second link is terminated and the first link is established or designated to be active. Once the vehicle event is detected, the vehicle telematics unit 30 can terminate any short-range wireless connections with wireless devices carried by vehicle occupants. This termination can be carried out by deactivating the second link and establishing the first link. Or in another implementation, the second link between the vehicle telematics unit 30 can be designated as a passive or secondary link such that it exists in the background but is not actively used by the vehicle telematics unit 30 when the first link between the unit 30 and the audio system 36 becomes active. By managing which of the first and second links are active or existing at a time, the vehicle telematics unit 30 can effectively manage its ability to support one short-range wireless connection. Communications between the vehicle occupant and a central facility can then be provided using the first link. The vehicle telematics unit 30 can call the call center 20 and establish a communications path between the vehicle occupant and a live advisor 86 or an automated voice response system 88. The vehicle occupant can speak into the microphone 34 passing the speech to the audio system 36, which the wirelessly transmits the speech to the vehicle telematics unit 30 via the first short-range wireless connection or link. The vehicle telematics unit 30 can then transmit the speech to the call center 20. In return, the vehicle telematics unit 30 can receive audio from the call center 20, transmit the audio over the first link to the audio system 36, which plays the audio through speakers located in the vehicle 12. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of communicating using a vehicle telematics unit and an in-vehicle audio system, comprising the steps of:
   (a) detecting a vehicle event at the vehicle telematics unit;
   (b) terminating any existing short-range wireless connections between the vehicle telematics unit and one or more wireless devices carried by a vehicle occupant;
   (c) establishing a short-range wireless connection between the vehicle telematics unit and the in-vehicle audio system; and
   (d) providing communications between the vehicle occupant and a central facility using the short-range wireless connection established during step (c).

2. The method of claim 1, wherein the vehicle event further comprises a vehicle accident detected by the vehicle telematics unit using one or more vehicle sensors.

3. The method of claim 1, wherein the vehicle event further comprises a button pushed inside a vehicle.

4. The method of claim 1, wherein step (b) further comprises placing the existing short-range wireless connections in a passive state.

5. The method of claim 1, wherein step (c) further comprises establishing short-range wireless connections using a Bluetooth protocol.

6. The method of claim 1, further comprising the step of providing communications between the vehicle occupant and a live advisor or an automated voice response system.

7. A method of communicating using a vehicle telematics unit and an in-vehicle audio system, comprising the steps of:
   (a) establishing a first link between the vehicle telematics unit and the in-vehicle audio system via a short-range wireless connection, wherein the first link is designated as a passive link;
   (b) establishing a second link between the vehicle telematics unit and a wireless device carried by a vehicle occupant, wherein the second link is designated as an active link;
   (c) detecting a vehicle event using the vehicle telematics unit;
   (d) terminating the second link and designating the first link to be active in response to step (c); and
   (e) providing communications between the vehicle occupant and a central facility using the first link.

8. The method of claim 7, wherein the vehicle event further comprises a vehicle accident detected by the vehicle telematics unit.

9. The method of claim 7, wherein the vehicle event further comprises a button pushed inside a vehicle.

10. The method of claim 7, further comprising establishing the first link and the second link using a Bluetooth protocol.

11. The method of claim 7, further comprising the step of providing communications between the vehicle occupant and a live advisor or an automated voice response system via the first link.

12. A system of communication, comprising:
    an in-vehicle audio system that includes a display, a microphone, one or more audio speakers, and a first antenna capable of communicating using one or more short-range wireless protocols; and
    a vehicle telematics unit having an electronic processing device, a memory device, and a second antenna capable of communicating using one or more short-range wireless protocols, wherein the vehicle telematics unit establishes a first link with the in-vehicle audio system via a short-range wireless protocol, establishes a second link with a wireless device carried by a vehicle occupant via a short-range wireless protocol, detects a vehicle event and terminates the second link, and provides communications between the vehicle occupant and a central facility using the first link.

13. The system of claim 12, wherein the first link and the second link are established using a Bluetooth protocol.

14. The system of claim 12, further comprising a sensor communicatively linked to the vehicle telematics unit, wherein the sensor provides data to the vehicle telematics unit for detecting a vehicle accident.

15. The system of claim 12, further comprising a button located in a vehicle and communicatively linked to the vehicle telematics unit, wherein the vehicle telematics unit detects the vehicle event when the button is pushed.

* * * * *